US012125485B2

(12) United States Patent
Rodriguez Bravo et al.

(10) Patent No.: US 12,125,485 B2
(45) Date of Patent: Oct. 22, 2024

(54) COORDINATION AND EXECUTION OF ACTIONS ON A PLURALITY OF HETEROGENOUS AI SYSTEMS DURING A CONFERENCE CALL

(71) Applicant: Kyndryl, Inc., New York, NY (US)

(72) Inventors: Cesar Augusto Rodriguez Bravo, Alajuela (CR); David Alonso Campos Batista, Aurora (CR); Romelia H. Flores, Keller, TX (US); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 322 days.

(21) Appl. No.: 17/691,661

(22) Filed: Mar. 10, 2022

(65) Prior Publication Data

US 2023/0290348 A1 Sep. 14, 2023

(51) Int. Cl.
*G10L 15/22* (2006.01)
*H04L 12/18* (2006.01)
*H04M 3/56* (2006.01)

(52) U.S. Cl.
CPC .......... *G10L 15/22* (2013.01); *H04L 12/1818* (2013.01); *H04L 12/1822* (2013.01); *H04M 3/565* (2013.01); *G10L 2015/223* (2013.01)

(58) Field of Classification Search
CPC ............... G10L 15/22; G10L 2015/223; H04L 12/1818; H04L 12/1822; H04L 51/02;
(Continued)

(56) References Cited

U.S. PATENT DOCUMENTS 6,668,055 B2  12/2003  Marwell et al.
7,548,895 B2   6/2009  Pulsipher
(Continued)

FOREIGN PATENT DOCUMENTS

AU  2003200674   9/2003
JP  2017535823  11/2017
JP  2019194839  11/2019

OTHER PUBLICATIONS

Mell et al., "The NIST Definition of Cloud Computing", NIST, Special Publication 800-145, Sep. 2011, 7 pages.
(Continued)

*Primary Examiner* — Abul K Azad
(74) *Attorney, Agent, or Firm* — Erik Swanson; Andrew Calderon; Calderon Safran & Wright P.C.

(57) ABSTRACT

A method includes: in response to identifying a primary user and corresponding Primary AI Assistant for a meeting, receiving by the Primary AI Assistant a confirmation to enroll at least one user personal digital assistant (PDA) of a respective one of at least one user; prompting the at least one user to provide descriptive information associated with the respective user PDA; connecting the at least one user PDA to the Primary AI Assistant internally by the Primary AI Assistant using the descriptive information for submitting requests; identifying by the Primary AI Assistant keywords and phrases received from the at least one user or primary user in the meeting; determining by the Primary AI Assistant a scheduling item based on the identified keywords and phrases; and automatically providing by the Primary AI Assistant the scheduling item to at least one user PDA corresponding to the scheduling item using the descriptive information.

18 Claims, 9 Drawing Sheets

(58) Field of Classification Search
CPC .......... H04M 3/565; H04M 2203/5009; G06F 3/167
See application file for complete search history.

(56) References Cited

U.S. PATENT DOCUMENTS

| | | | |
|---|---|---|---|
| 7,676,221 | B2 | 3/2010 | Roundtree et al. |
| 9,729,592 | B2 | 8/2017 | Slayton et al. |
| 10,496,753 | B2 | 12/2019 | Gruber et al. |
| 10,536,288 | B1 | 1/2020 | Leblang et al. |
| 11,627,006 | B1* | 4/2023 | Chew ................ H04L 51/02 704/275 |
| 2002/0196922 | A1 | 12/2002 | Marwell et al. |
| 2007/0293200 | A1 | 12/2007 | Roundtree et al. |
| 2008/0005053 | A1 | 1/2008 | Pulsipher |
| 2008/0167937 | A1* | 7/2008 | Coughlin ........... G06Q 10/1093 705/7.19 |
| 2012/0022872 | A1 | 1/2012 | Gruber et al. |
| 2013/0073200 | A1* | 3/2013 | Coughlin ............... G01S 19/42 701/465 |
| 2014/0109046 | A1* | 4/2014 | Hirsch .................... G06F 8/70 717/120 |
| 2015/0215350 | A1 | 7/2015 | Slayton et al. |
| 2019/0279615 | A1 | 9/2019 | Ben-Dor et al. |
| 2019/0372655 | A1* | 12/2019 | Pinder ................ H04B 7/15557 |
| 2020/0034797 | A1* | 1/2020 | Jonnalagadda ......... H04L 51/02 |
| 2020/0177649 | A1 | 6/2020 | Shang et al. |
| 2021/0375289 | A1* | 12/2021 | Zhu ....................... G06F 40/253 |
| 2023/0046890 | A1* | 2/2023 | Ost .................... G06Q 10/1095 |
| 2023/0325590 | A1* | 10/2023 | Shevchenko ............ G06N 5/04 715/200 |

OTHER PUBLICATIONS

Unknown, "Can I use Siri DURING a phone call?", https://discussions.apple.com/thread/6058203, posted on Apr. 3, 2014, 2 pages.

Tim Brookes, "How to Use Your iPhone While on a Phone Call", https://www.howtogeek.com/444758/how-to-use-your-phone-while-on-a-phone-call/, How-To Geek, Oct. 30, 2019, 7 pages.

Aakarsh, ""Alexa, join my meeting"—Join conference calls with Alexa, now open to all Alexa users!", https://aws.amazon.com/blogs/business-productivity/alexa-join-my-meeting-join-conference-calls-with-alexa-now-open-to-all-alexa-users/, Apr. 4, 2019.

* cited by examiner

COORDINATION AND EXECUTION OF ACTIONS ON A PLURALITY OF HETEROGENOUS AI SYSTEMS DURING A CONFERENCE CALL

BACKGROUND

Aspects of the present invention relate generally to using personal digital assistants during a conference call and, more particularly, to assigning a principal, or primary, artificial intelligence based (AI-based) personal assistant to the meeting host or moderator which coordinates with meeting participants' personal digital assistants (i.e., secondary or user personal digital assistants).

Participants in conference calls, both video and audio-only, frequently coordinate next steps and future meetings. Often a participant uses a personal digital assistant (PDA) to put a meeting or To-Do item on their calendar. In some cases, a participant will speak aloud to their PDA in order to enter a calendar item or task. Originally, the term PDA was used for a small, mobile, handheld device that provides computing and information storage and retrieval capabilities for personal or business use, often for keeping schedules, calendars, and address book information handy. However, PDAs and the term have evolved over time. In the 2010s, the technology industry started to use the term "personal digital assistant" for newer technologies having a similar function. The term now more commonly refers to software that recognizes a user's voice and uses artificial intelligence to respond to queries. The term virtual assistant may also be used for this type of software.

SUMMARY

In a first aspect of the invention, there is a computer-implemented method including: in response to identifying a primary user and corresponding Primary artificial intelligence (AI) Assistant for a meeting, receiving by the Primary AI Assistant a confirmation to enroll at least one user personal digital assistant (PDA) of a respective one of at least one user; prompting the at least one user to provide descriptive information associated with the respective user PDA; connecting the at least one user PDA to the Primary AI Assistant internally by the Primary AI Assistant using the descriptive information for submitting requests; identifying by the Primary AI Assistant keywords and phrases received from the at least one user or primary user in the meeting; determining by the Primary AI Assistant a scheduling item based on the identified keywords and phrases; and automatically providing by the Primary AI Assistant the scheduling item to at least one user PDA corresponding to the scheduling item using the descriptive information.

In another aspect of the invention, there is a computer program product including one or more computer readable storage media having program instructions collectively stored on the one or more computer readable storage media. The program instructions are executable to: receive by a Primary artificial intelligence (AI) Assistant associated with a primary user in a conference call, meeting segment information; receive by the Primary AI Assistant a mode setting for one of either an interrupt mode or a non-interrupt mode; identify, by the Primary AI Assistant at least one other user in the conference call, wherein at least one of the at least one other user has a corresponding user personal digital assistant (PDA); provision the at least one corresponding user PDA for automatic access by the Primary AI Assistant; identify by the Primary AI Assistant a possible scheduling or task item based on keywords and phrases spoken during the conference call; responsive to identifying the possible scheduling or task item, prompt the primary user for more information corresponding to the possible scheduling or task item, wherein the prompting is performed during the conference call when in the interrupt mode and the prompting is performed at a predetermined time during or after the conference call when in the non-interrupt mode; receive the more information from the primary user; generate a scheduling or task item based on the keywords and phrases and the more information; and automatically provide by the Primary AI Assistant the scheduling or task item to the at least one user PDA provisioned for automatic access.

In another aspect of the invention, there is system including a processor, a computer readable memory, one or more computer readable storage media, and program instructions collectively stored on the one or more computer readable storage media. The program instructions are executable to: receive by a Primary artificial intelligence (AI) Assistant associated with a primary user in a conference call a mode setting for one of either an interrupt mode or a non-interrupt mode; identify by the Primary AI Assistant a plurality of users in the conference call, wherein at least one of the plurality of users has a corresponding user personal digital assistant (PDA); provision the corresponding user PDA for automatic access by the Primary AI Assistant; identify by the Primary AI Assistant keywords and phrases spoken during the conference call, wherein the keywords and phrases correspond to a scheduling item; responsive to identifying the keywords and phrases, prompt the primary user for more information corresponding to the keywords and phrases, wherein the prompting is performed during the conference call when in the interrupt mode and the prompting is performed at a predetermined time during or after the conference call when in the non-interrupt mode; receive the more information from the primary user; generate the scheduling item based on the keywords and phrases and the more information; and automatically provide by the Primary AI Assistant the scheduling item to the corresponding user PDA provisioned for automatic access.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
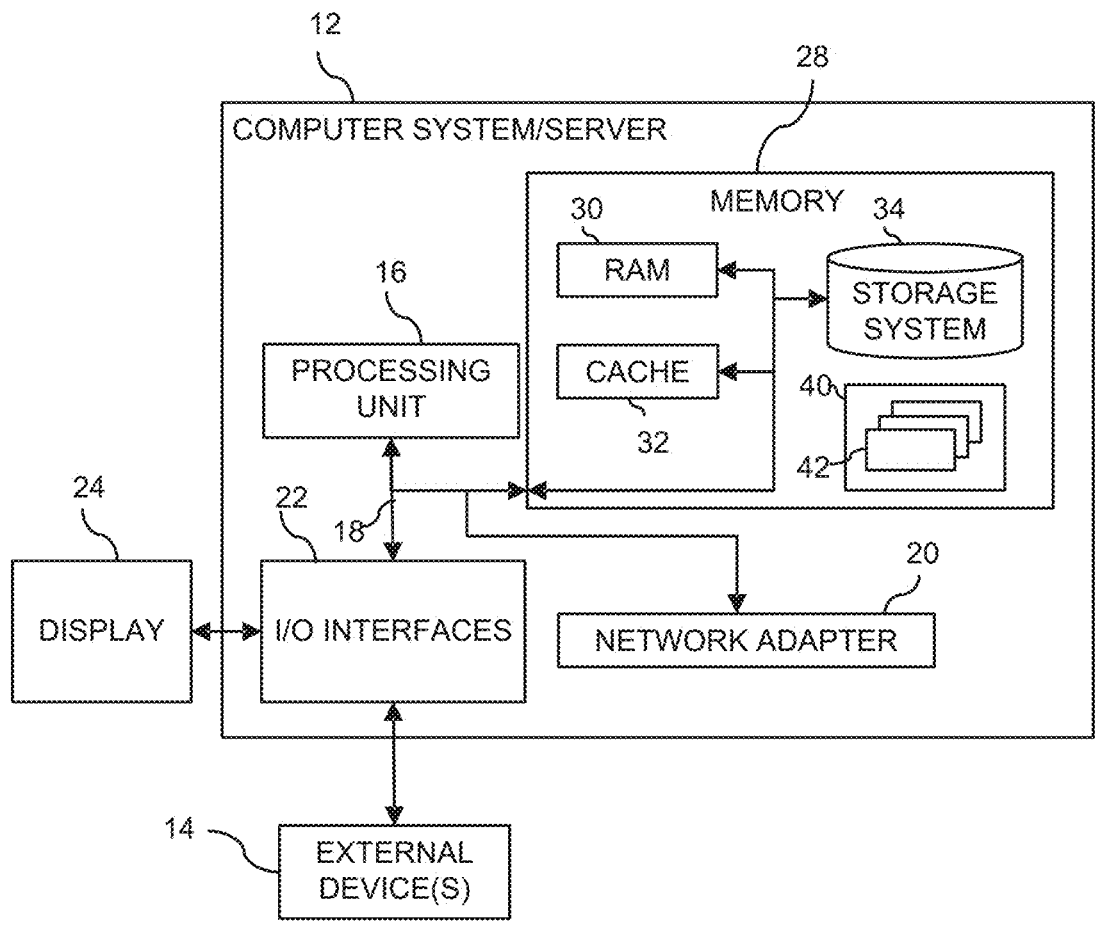
FIG. 1 depicts a cloud computing node according to an embodiment of the present invention.

Aspects of the present invention relate generally to using PDAs during a conference call or meeting and, more particularly, to assigning a principal or primary artificial intelligence based (AI-based) PDA, referred to herein as the Primary AI Assistant, to the meeting host, moderator, or meeting recording secretary. The Primary AI Assistant automatically coordinates with meeting participants' PDAs (herein referred to as user PDAs). According to aspects of the invention, the Primary AI Assistant identifies references to upcoming meetings and tasks and sends them to meeting participants, as necessary. In embodiments, the Primary AI Assistant is authorized to modify the participants' calendars and task lists directly. In another embodiment, the Primary AI Assistant automatically sends meeting requests and other follow-up task data to participants via e-mail, messaging, or other electronic communication. In an embodiment, a user PDA may include the same functionality as a Primary AI Assistant, but act in a subordinate (e.g., user) mode if the user is not the meeting moderator, facilitator, or recording secretary, etc., to be discussed more fully below.

Participants in conference calls, both video and audio-only, and also for in-person meetings, frequently coordinate next steps and future meetings. Often a participant uses a personal digital assistant (PDA) (i.e., digital virtual assistant) to put a meeting or To-Do item on their calendar. For illustrative purposes, these user devices are referred to herein as user PDAs, for simplicity. It will be understood that a user PDA may be integrated with a handheld device, smart speaker, mobile device, or other computing device. In many cases, a participant will speak aloud to their PDA in order to enter a calendar item or task. If the participant is unmuted, other participants' user PDAs sometimes recognize the spoken keyword (e.g., trigger word or phrase, such as "Alexa," "Hey, Google," Hey, Bixby," or "Hey, Siri," etc.), and try to respond. These keywords may trigger a smart speaker such as an AMAZON® ECHO® device; a Web search such as provided by GOOGLE®; a SAMSUNG® GALAXY BIXBY HELLO™ assistant, or SIRI® response available for the APPLE® IPHONE®. This can be very confusing and disruptive to participants, especially participants who are not to be included in the next meeting or task. Further, a participant's user PDA might understand that "schedule a meeting on Tuesday at 2 PM with Juan and Amelia" means that it should enter a calendar item. However, existing systems will not coordinate with Juan and Amelia's calendars. Thus, any meeting created will typically only appear on the speaker's calendar. Embodiments as described herein provide a Primary AI Assistant to coordinate with other participants' user PDAs during or immediately following the meeting. In this manner, implementations of embodiments described herein improve meetings and conference calls and enable the automatic scheduling of meetings and tasks among the participants to provide more efficient and collaboration environment.

In accordance with one aspect of the invention, a computer-implemented process is described for coordinating and executing actions on a plurality of heterogenous artificial intelligence (AI) systems such as virtual assistants during a conference call. The computer-implemented process comprises: in response to receiving, by a Primary AI Assistant in a Web conference system, a confirmation to enroll a user PDA of a respective user, prompting the respective user to provide descriptive information associated with the user PDA including type, brand, model, application programming interface (API), and application programming interface key; connecting the user PDA to the Primary AI Assistant internally by the Primary AI Assistant using the descriptive information for submitting requests; in response to detecting by the Primary AI Assistant a command issued by a user, determining which user issued the command; in response to a determination of which user issued the command, sending the command to the user PDA of the user who issued the command to execute the command only on that user PDA; receiving by the Primary AI Assistant information associated with execution of the command; waiting by the Primary AI Assistant for an indication the command has executed; in response to a determination by the Primary AI Assistant that no acknowledgement was received confirming completion of the command, performing one of resending the command a user predetermined number of times to the user PDA of the user who issued the command, and providing feedback to the user that the command was not received by the user PDA. The process further comprises determining by the Primary AI Assistant whether the call has completed; and in response to a determination the call has completed, ending the call.

Implementations of various embodiments may provide an improvement in the technical field of collaborative digital assistants. In particular, implementations assign a Primary AI Assistant to manage calendars, tasks and other items during a conference call or meeting. The Primary AI Assistant identifies a speaker as the primary speaker, or meeting moderator, and automatically listens for commands from the moderator. Commands for tasks and calendar items are automatically coordinated with other participants' user PDAs. The Primary AI Assistant may be configured to query the moderator during the meeting with follow-up questions regarding the commands (e.g., interrupt mode), or wait until the end of the meeting to tie up loose ends (e.g., non-interrupt mode). Participants may provide access information for their user PDAs to a trusted Primary AI Assistant to enable automatic entry to their calendar and task lists. The user PDAs communicate over a network. When a participant's user PDA does not allow direct manipulation of its calendar, the Primary AI Assistant may send meeting and task requests to the participants via e-mail or by storing corresponding information in a shared storage device for retrieval by the participant after the meeting. The Primary AI Assistant includes a voice recognition module which is has a trained machine learning model to recognize the moderator's voice so that it does not respond to other participants. The Primary AI Assistant also includes a natural language understanding module which includes a trained machine learning model enabling it to identify commands for scheduling meetings and tasks during the conference call conversation. In an embodiment, the Primary AI Assistant automatically modifies participants' electronic calendars and task lists. In an embodiment, the Primary AI Assistant automatically sends electronic communications to the participants based on commands identified in the conference. These automatic interactions with participants and their electronic devices and stored calendars serve to change the state of participants electronic devices and data and improve the efficiency of collaborative conference calls and meetings.

It should be understood that, to the extent implementations of the invention collect, store, or employ personal information provided by, or obtained from, individuals (for example, participant identification, voice recognition, and automatic access to electronic calendars and task lists), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
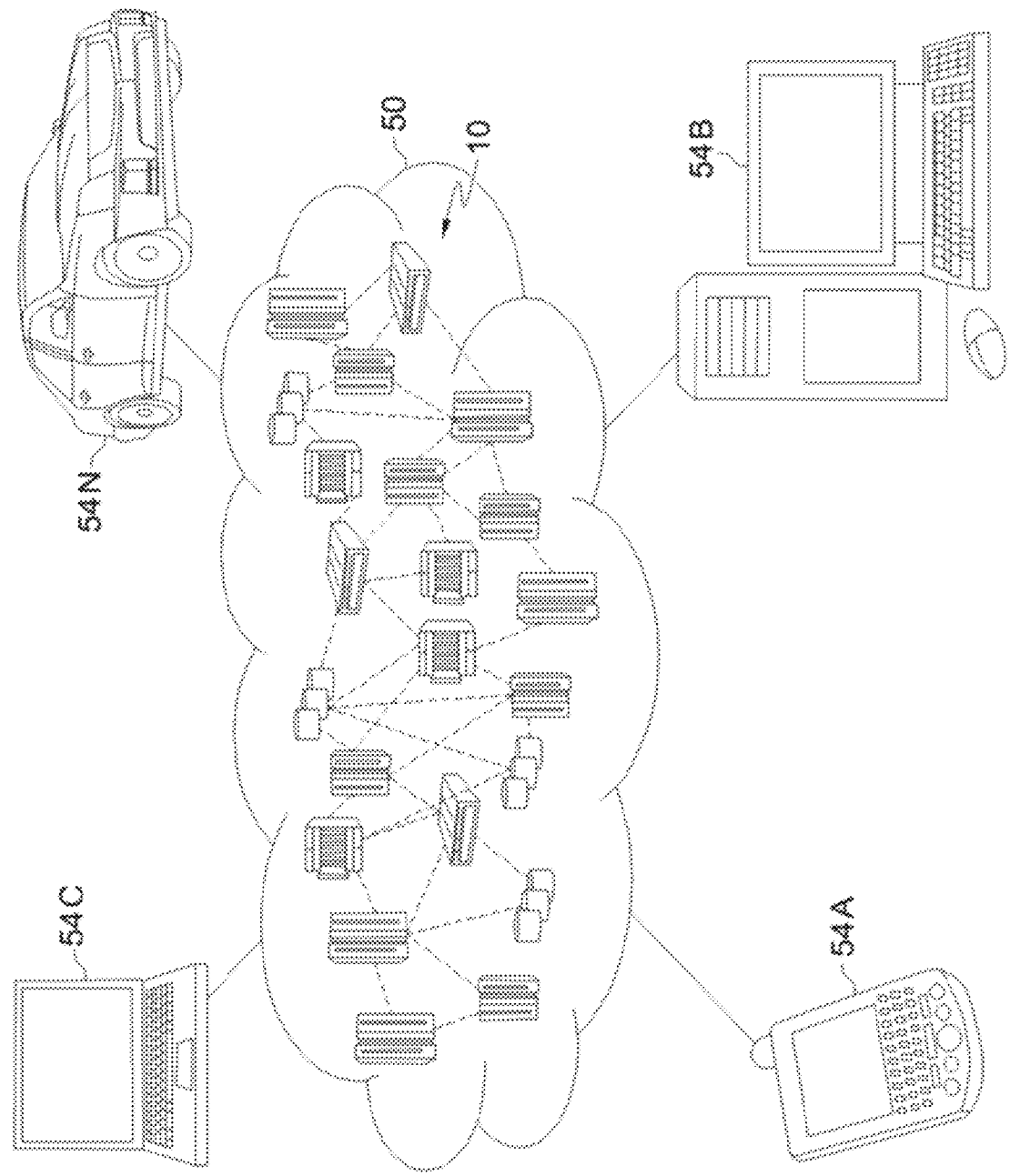
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
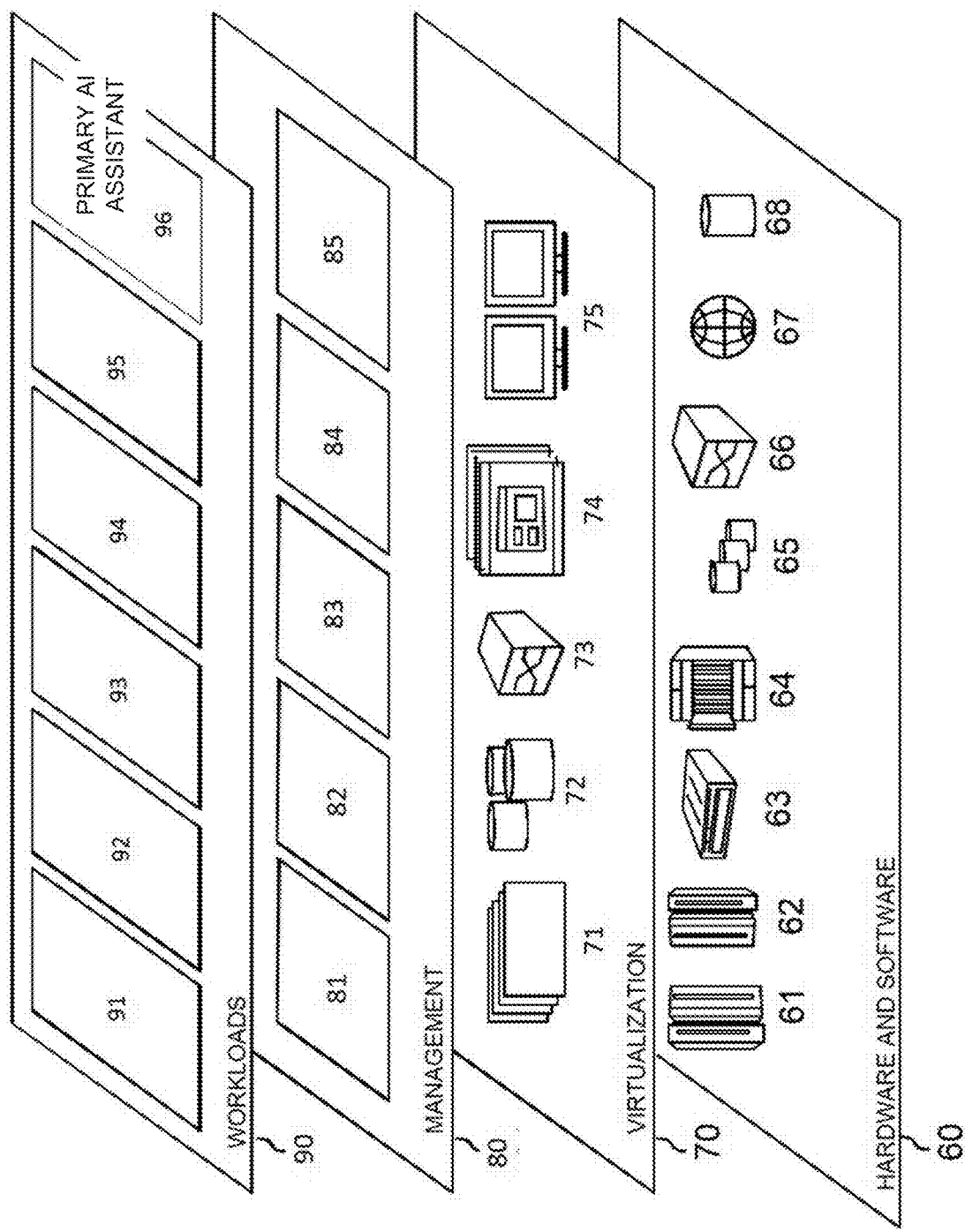
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Primary AI Assistant 96.

Implementations of the invention may include a computer system/server 12 of FIG. 1 in which one or more of the program modules 42 are configured to perform (or cause the computer system/server 12 to perform) one of more functions of the Primary AI Assistant 96 of FIG. 3. For example, the one or more of the program modules 42 may be configured with a voice recognition module, natural language understanding (NLU) module, scheduling module, and collaboration module.

Figure 4:
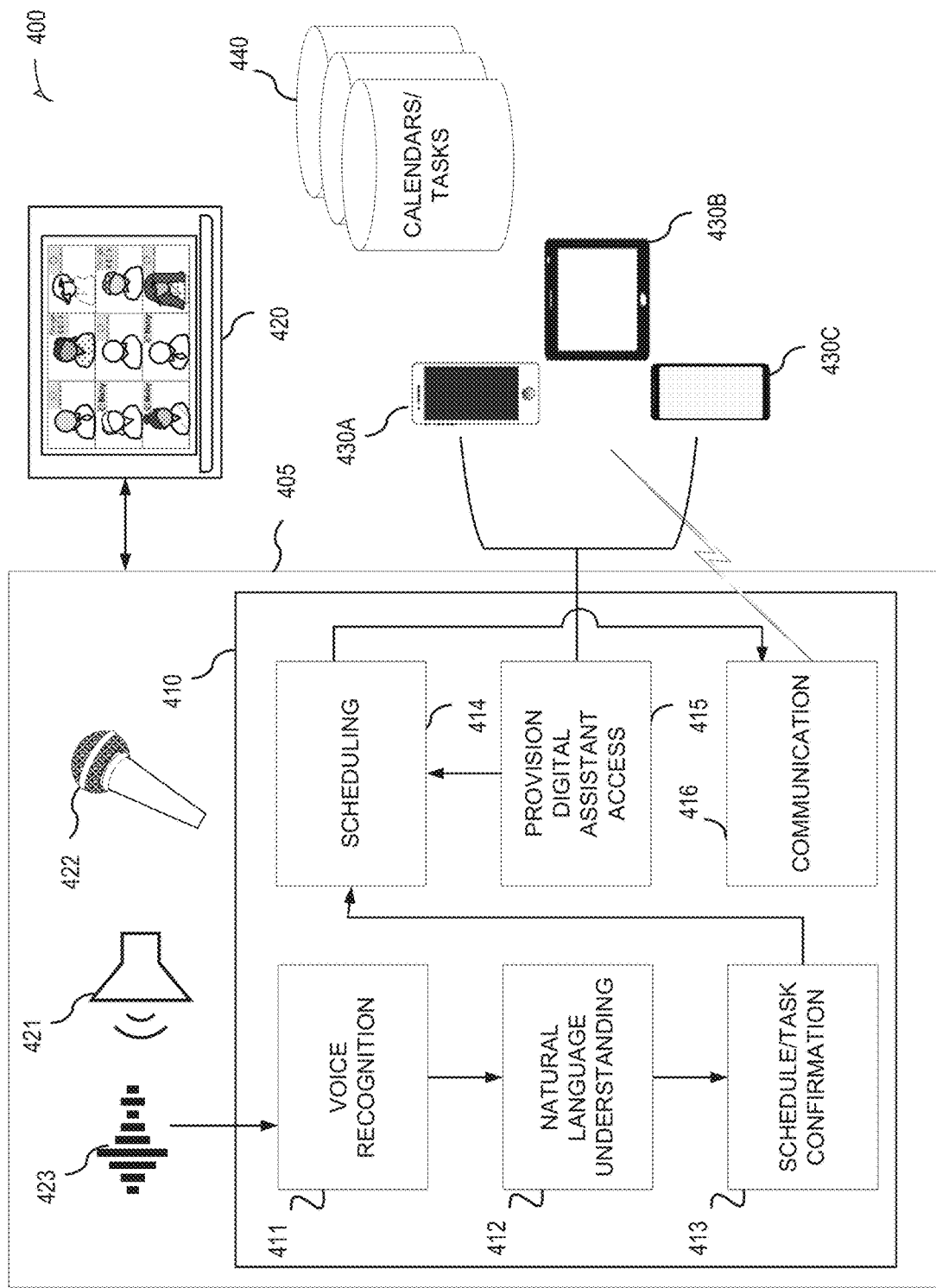
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a Primary AI Assistant 410. The Primary AI Assistant 410 includes program modules that may be implemented in a computing device 405. In embodiments, the computing device may be a handheld mobile device (i.e., a mobile Internet device, or a mobile cellular phone, etc.), or a tablet, notebook, laptop, desktop computer, smart speaker device, or another device. The computing device 405 is communicatively coupled to at least a microphone 422, speaker 421, and communication network, such as the cloud computing environment 50 as shown in FIG. 2. In an embodiment, the program modules of the Primary AI Assistant 410 may be integrated into a conference call system used by the primary user. In another embodiment, the Primary AI Assistant 410 may be integrated into a second user device, such as the computing device 405 discussed above. The Primary AI Assistant 410 receives audio input 423 from a conference call 420 as illustrated on a display. It will be understood that the conference call 420 may be an audio or video conference call or be a meeting that is partially or fully conducted in person. The term conference call 420 is used herein and shown here on a display for illustrative purposes.

In this example, participants connect to the conference call with a personal device 430A-C. In an embodiment, a participant's personal device used for the conference call may be integrated with the participant's user PDA. In another embodiment, the participant's user PDA may be a second device in possession of the user while participating in the conference call. In another embodiment, the participant's user PDA may be in their possession during an in-person meeting. For illustrative purposes, the personal devices 430A-C are represented to include the participant's respective user PDA. It will be understood that a person's user PDA may be integrated with their conference call system or be implemented on a separate device, but is shown here as one device for simplicity. In an embodiment, a user connects to a conference call with a first device, such as a laptop, desktop, or tablet computing device, etc., and has a separate personal device 430A-C that includes a user PDA component. In another embodiment, a user connects to the conference call with the personal device 430A-C that also includes a user PDA component. It will also be understood that a users' personal device 430A-C may be a secondary device that is not fully integrated into the conference call system.

Audio input 423 from speaker 421 or directly from microphone 422 includes voice input from participants of the conference call 420. The Primary AI Assistant 410 is managed and controlled by the conference call moderator, host, recording secretary or other person responsible for creating schedules, meetings, and tasks for the participants (herein referred to as the primary user). The Primary AI Assistant 410 may operate in whole or in part on the primary user's device 405 with some functions provided by a remote server (not shown). The primary user's device 405 and remote server may be implemented on computer systems (such as computer system/server 12 of FIG. 1). The Primary AI Assistant 410 may include one or more program modules (such as program modules 42 of FIG. 1). In embodiments, the Primary AI Assistant 410 includes a voice recognition module 411 to receive the audio input 423. The voice recognition module 411 may use a trained natural language processing (NLP) and/or acoustic model to identify a current speaker and respond to commands and instructions from the primary user. In an embodiment, the voice recognition module 411 recognizes voices of other participants to identify a current speaker as a participant who is not the primary user.

In embodiments, the Primary AI Assistant 410 includes a natural language understanding (NLU) module 412 using a trained NLU model to recognize keywords, commands, instructions, and responses within the context of the conference call 420. For instance, in an embodiment, the Primary AI Assistant 410 knows which users are participating in the conference call. The participants may be known by an input attendee list, voice recognition of participants, login identifiers for electronic conference calls, or by other methods. The NLU module 412 recognizes when the primary user issues a voice command such as, "Schedule a meeting on Tuesday at 2 P.M. with Juan and Amelia." If the attendees of the conference call are known to the Primary AI Assistant 410, the Primary AI Assistant 410 may wait for a voice response from both Juan and Amelia before automatically scheduling a meeting.

In embodiments, when the NLU module 412 recognizes a command or instruction to schedule meetings or tasks, the Primary AI Assistant 410 prepares the information for scheduling. The scheduling/task confirmation module 413 confirms the availability of participants and either prepares the meetings or tasks to automatically add to the participants' schedules/task lists, or holds the information for later confirmation, as discussed more fully below. Once the schedules or tasks are confirmed, the scheduling module 414 formats the items for automatic inclusion in the participants' schedules/task list or prepares the items to be sent to the participants via an electronic communication. In an embodiment, a conference call participant provides access and security information for their own user PDA, illustrated here as part of the personal device 430A-C, to the Primary AI Assistant 410 in a module to provision digital assistant access 415. When the Primary AI Assistant 410 has direct access to the participant's user PDA the user's schedule and task list may be automatically updated with new or changed items via the communication module 416. When a user has not provided security access of their user PDA to the Primary AI Assistant 410, the communication module 416 sends a meeting request or task request to the user via an e-mail, electronic message, or update to a shared storage location 440.

In embodiments, the primary user's computing device 405 comprises a Primary AI Assistant 410 including a voice recognition module 411, natural language understanding module 412, schedule/task confirmation module 413, scheduling module 414, provision digital assistant access module 415, and communication module 416, each of which may comprise one or more program modules such as program modules 42 described with respect to FIG. 1. The primary user's computing device 405 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4. In embodiments, some program modules, or functions of a program module 42 are provided by a remote server in communication with the Primary AI Assistant 410.

Figure 5:
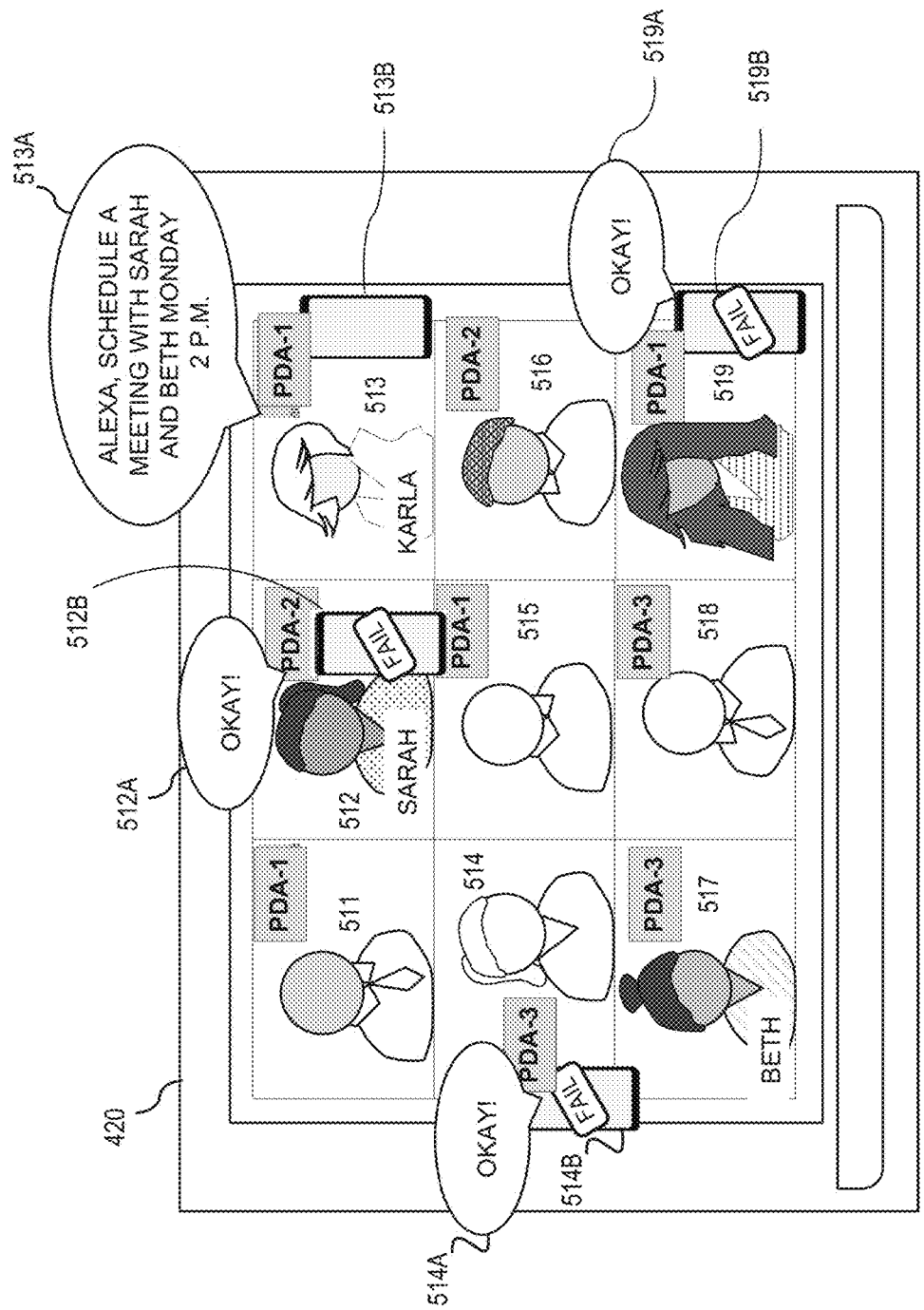
FIG. 5 shows a block diagram of an exemplary conference call in accordance with aspects of the invention.

FIG. 5 shows a block diagram of a representation of an exemplary conference call, in accordance with aspects of the present invention. Elements of the conference call may be carried out in the environment of FIG. 4 and are described with reference to elements depicted in FIG. 4. In embodiments as described herein, a Primary AI Assistant 410 is leveraged during a conference call 420 to help support specific administrative action items that are received during a call by the primary user 513, while preventing the activation of another user using their own user PDA. In an example, a plurality of attendees 511-519 are present in a conference call 420. In this example, user 513 is the primary user and has a corresponding Primary AI Assistant 410 (FIG. 4). The Primary AI Assistant 410 may be integrated with the primary user's personal digital assistant of type PDA-1 on personal device 513B, as described in reference to the computing device 405 of FIG. 4. In another example, the Primary AI Assistant 410 may be integrated with a separate computer system such as the computer system/server 12 of FIG. 1. Users 512, 514 and 519 have personal devices 512B, 514B and 519B, respectively, where a user's personal device may include a user PDA. In this example, users 512, 514, and 519 have their personal devices 512B, 514B, and 519B present with them in the conference call 420. It will be understood that personal devices 512B, 514B, and 519B may be similar to personal devices 430A-C which include respective user PDAs as shown in FIG. 4. Users 512, 514, and 519 may use heterogenous user PDAs on their personal devices 512B, 514B, and 519B, which make it difficult to effectively use a voice-based digital assistant during the conference call 420. In this example, user Sarah 512 uses a personal digital assistant of type PDA-2 on personal device 512B; user Karla 513 uses a personal digital assistant of type PDA-1 on personal device 513B; user 514 uses a personal digital assistant of type PDA-3 on personal device 514B; and user 519 uses a personal digital assistant of type PDA-1 on personal device 519B, etc. In an embodiment, the primary user 513 has a personal device 513B which includes a Primary AI Assistant 410. In an embodiment, the Primary AI Assistant 410 is integrated into a second computing device (not shown) such as that integrated with the conference call system or communicatively coupled to the conference call system. The Primary AI Assistant 410 coordinates aspects required to enable participants in the conference call to utilize their own user PDAs to perform tasks targeted to a digital assistant.

In an embodiment, the Primary AI Assistant 410 is integrated with a Web-hosted conference system. When enrolling a conference call, the provision digital assistant access module 415 queries each user as to whether they want to enroll their own user PDA to be used during the call. If yes, then the provision digital assistant access module 415 requests the user to provide the information regarding the PDA configuration. In an example, the PDA configuration data needed for provisioning or accessing the PDA schedule and task list includes, but is not limited to: PDA type, brand, and model; PDA API; and PDA API Key. This configuration data is associated with the particular user so that the Primary AI Assistant 410 can internally, or directly, connect to a participant's user PDA, with minimal or no user intervention, to issue requests such as a schedule entry modification. In an embodiment, the primary user sets up a wake keyword for the Primary AI Assistant 410. When the audio input 423 indicates that the wake word has been spoken by the primary user, as indicated by the voice recognition module 411, the subsequent audio stream is parsed by the NLU module 412 to identify any commands or instructions 513A to be processed by the schedule/task confirmation module 413 and scheduling module 414.

In an embodiment, when the Primary AI Assistant 410 identifies the wake word and subsequent command issued by a recognized user other than the primary user, it may coordinate the recognized user PDA to execute the given command on the user PDA. If the spoken command 513A were heard by all user PDAs of personal devices 512B, 514B, and 519B, that are listening to the conference call 420, each of those user PDAs might respond with "Okay" 512A, 514A, and 519A, but proceed to fail because the command was not meant for them to process.

Figure 6:
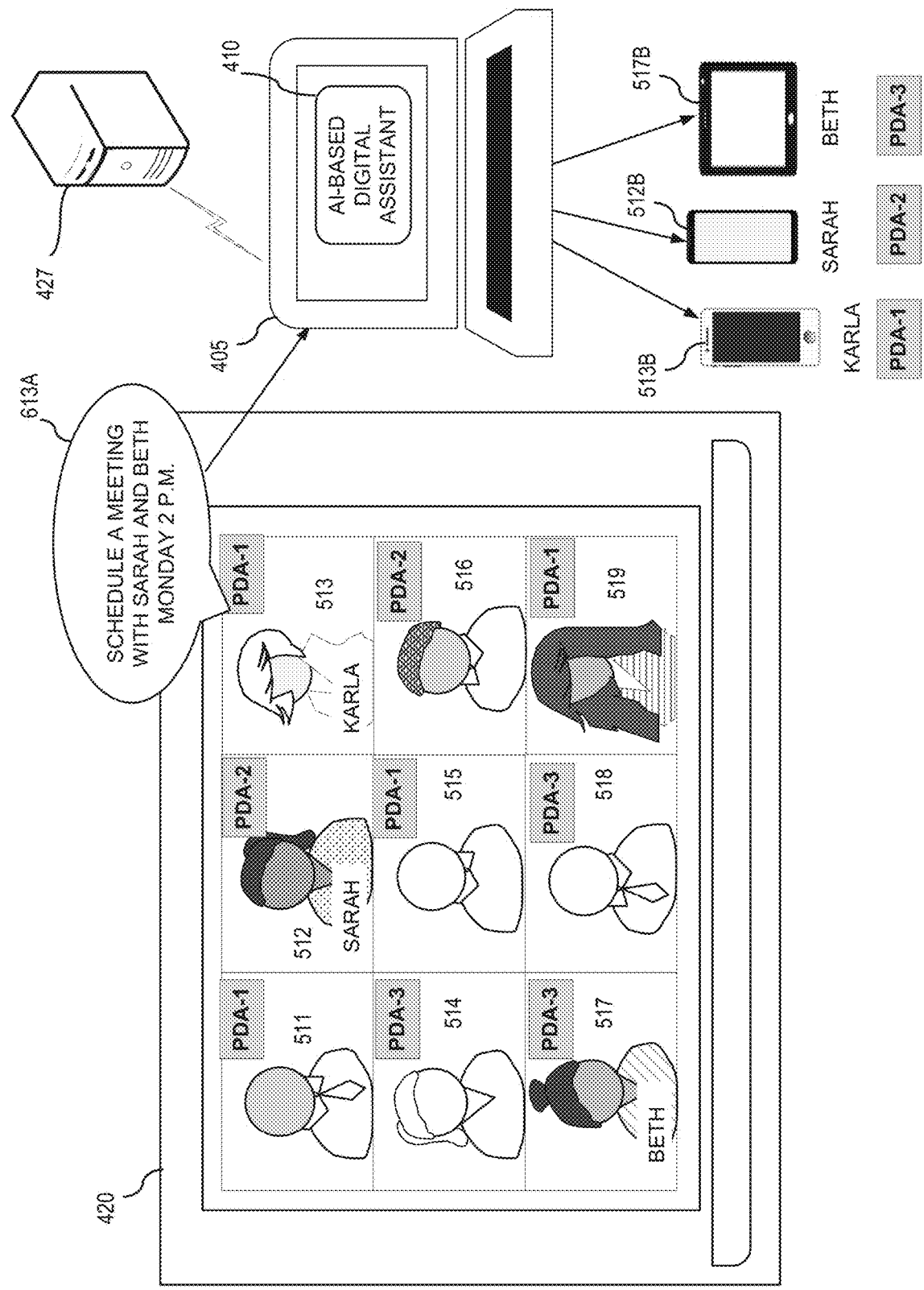
FIG. 6 shows a block diagram of an exemplary conference call representation in accordance with aspects of the present invention.

FIG. 6 shows a block diagram of an exemplary conference call representation, in accordance with aspects of the present invention. Elements of the conference call 420 may be carried out in the environment of FIG. 4 and are described with reference to elements depicted in FIG. 4. In this example, Karla 513 is the primary user, and Sarah 512 and Beth 517 are conference call participants. Sarah 512 and Beth 517 have personal devices 512B and 517B, respectively. Personal devices 512B and 517B include a respective user PDA. Karla 513 has a personal device 513B which includes the Primary AI Assistant 410. In an embodiment, users may have personal devices with them in the conference call but be connected to the web-based conference call via a secondary device such as a desktop or laptop computer (not shown). In an embodiment, the Primary AI Assistant 410 is included with the primary user's computing device 405 which is separate from their personal device 513B. In an example, Karla 513 wakes the Primary AI Assistant 410 with the wake keyword and utters, "schedule a meeting with Sarah and Beth Monday 2 PM" 613A. The Primary AI Assistant 410 identifies the context of the command and for which participants a meeting should be scheduled, e.g., Sarah 512 and Beth 517. If Sarah 512 and Beth 517 had provided provisioning access configuration data, then the Primary AI Assistant 410 can directly modify the participants' calendars, applications, contacts, tasks, etc., by sending formatted requests to the participants' user PDAs. If a participant has not provided the security and provisioning information for their user PDA, then the Primary AI Assistant 410 may send a request for meeting, task, or other modification to the recipient via an electronic communication for manual resolution of the request. In an embodiment, the Primary AI Assistant 410 is communicatively coupled with a remote server 427. Remote server 427 may be a computer system/server 12 as described in FIG. 1. In an embodiment, remote server 427 may include one or more modules, such as the natural language understanding module 412, scheduling module 414, etc., to offload computational tasks from the primary user's computing device 405.

In an example, Karla 513 initiates a spoken command, "schedule a meeting with Sarah and Beth at Beth's office on Wednesday next week." In this example, Karla cannot reserve a conference room at Beth's location. Instead, a follow-up request is sent to Beth's PDA to schedule a room. Karla's Primary AI Assistant 410 waits for confirmation that the room has been scheduled before putting the meeting on the users' calendars. In an embodiment, the schedule/task confirmation module 413 waits for an acknowledgment message, i.e., "Okay," from the users' PDAs for confirmation that the requests have been received and executed. In an embodiment, when the acknowledgment message is not received, the schedule/task confirmation module 413 resends the request up to a predetermined N number of times, where the primary user configures N, and provides feedback to the primary user that the command was not received by a user's PDA. This feedback can be a voice alert, SMS text message or by other means.

FIG. 6 shows that the voice command 613A spoken by Karla enables the Primary AI Assistant 410 to pass the formatted command to the user PDAs of respective personal devices 513B, 512B, and 517B for Karla 513, Sarah 512, and Beth 517, respectively. In this example, the Primary AI Assistant 410 uses the context of the conference call 420 and the parsed command 613A to automatically generate a meeting item on the calendars of Karla, Sarah, and Beth, but not the other users in the conference call, e.g., participants 511, 514-516, 518-519.

In an embodiment, the Primary AI Assistant 410 has an interrupt mode and a non-interrupt mode. In the non-interrupt mode, the Primary AI Assistant listens, tracks and generates draft scheduling and task items, but does not interrupt the participants for follow-up during the meeting. Instead, the Primary AI Assistant 410 waits until the end of the conference call or a receipt of a query from the primary user before finalizing the items to be sent to participants' PDAs. In interrupt mode, the Primary AI Assistant may interrupt participants to ask clarifying questions to ensure appropriate processing of the primary user's commands and instructions. In an embodiment, scheduling and task items may be automatically communicated to the participants' PDAs before the conference call is ended. These modes are discussed more fully, below.

Figure 7:
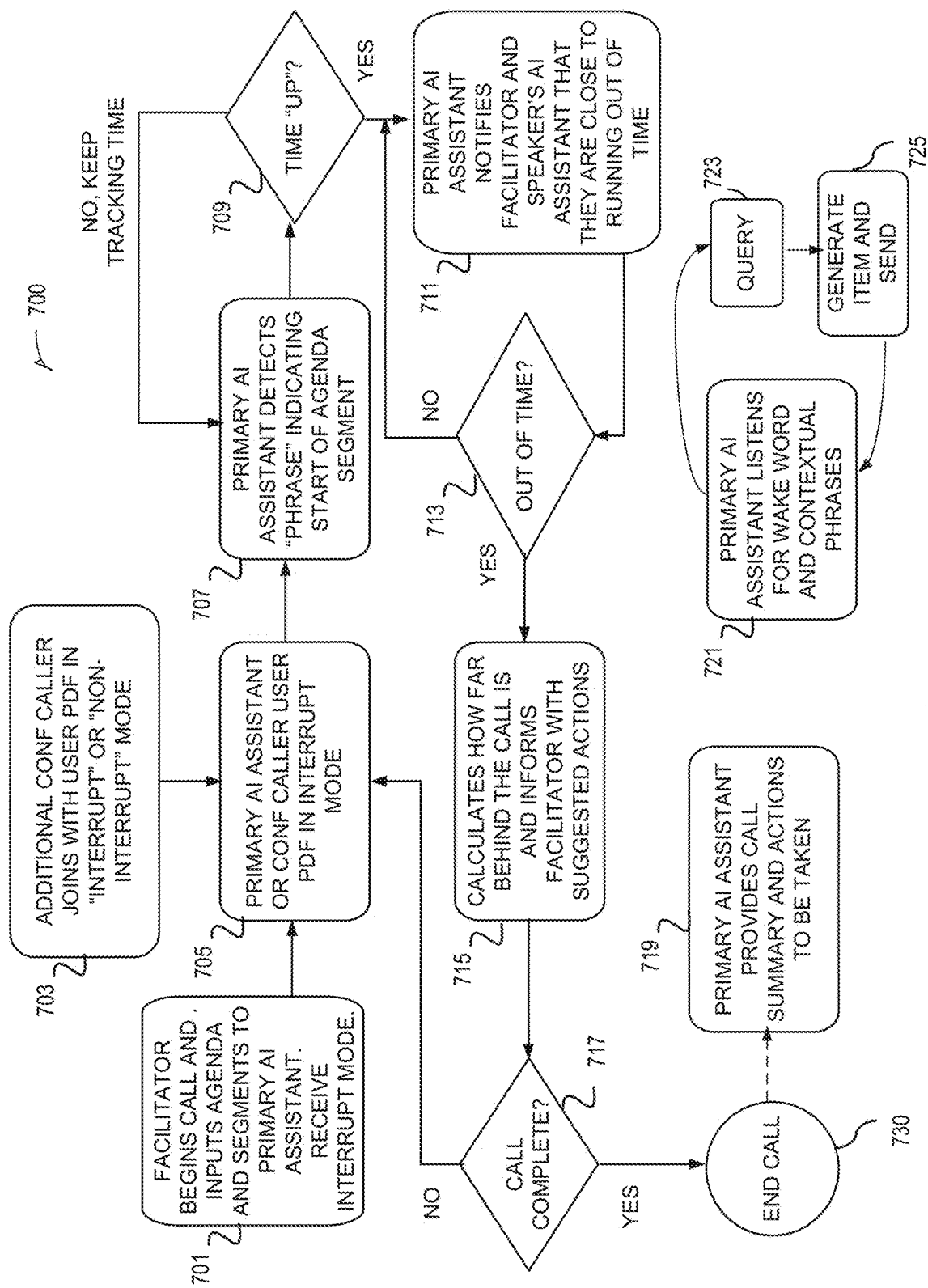
FIG. 7 shows a flow diagram of an exemplary method to perform in interrupt mode according to an embodiment.

FIG. 7 shows a flow diagram of an exemplary method 700 to perform in interrupt mode, according to an embodiment. The facilitator, e.g., primary user, initiates the conference call in block 701. The primary user may select that the conference call should be conducted with interrupt or non-interrupt mode. It will be understood that the primary user can switch back and forth from interrupt to non-interrupt modes during the conference call, for instance, by speaking a command to a Primary AI Assistant. The Primary AI Assistant is associated with the primary user and operatively coupled to the conference call system. The primary user may input an agenda and meeting segments to the Primary AI Assistant prior to or at commencement of the conference call. An additional participant joins the conference call at block 703. The additional participant may have their own user PDA. Any participant other than the primary user with a user PDA will have their user PDA set for a mode that will not attempt to coordinate tasks in the conference call. The additional participant may also set their user PDA to interrupt or non-interrupt mode.

The primary user sets their Primary AI Assistant to interrupt mode, e.g., provides a mode setting of interrupt, in block 705, to ensure timely delivery of scheduling and task items to participants in the call without having to wait until meeting end to clean-up and confirm items to be sent to participants. During conversations in the conference call, the Primary AI Assistant detects a phrase indicating the start of an agenda segment in block 707. This detection helps identify context for the call. In an embodiment, the Primary AI Assistant may also be the meeting timekeeper to ensure that the conference call is kept on track. In this case, the Primary AI Assistant determines whether time is up for the current agenda segment in block 709. If not, the Primary AI Assistant continues to track time and listen for agenda segment identifying phrases in block 707. If time is up for the current agenda segment, as determined in block 709, the Primary AI Assistant notifies the primary user and the current speaker via their user PDAs that they are close to running out of time, in block 711. The Primary AI Assistant determines if they are not out of time in block 713 and if so, notifies the primary user and speaker again in block 711. If the Primary AI Assistant determines that they are out of time, then it calculates how far behind the call is and informs the primary user with suggested actions in block 715.

The Primary AI Assistant listens for the wake keyword or phrases that indicate that the participants need to perform a scheduling action or task in block 721. If the primary user speaks a scheduling or task command directly to the Primary AI Assistant following the wake word, the Primary AI Assistant generates a calendar item or task for the requested participants. If the primary user's command is ambiguous, the Primary AI Assistant asks for clarification before generating the item. If the item is unambiguous, it is sent to the appropriate participants' user PDAs either directly or as a request, as discussed above. The Primary AI Assistant also listens for key words and phrases among the participants to determine whether a scheduling or task item are to be generated, in block 721. In an example, Juan may say to Beth, "I think we need to have another meeting early next week." In this example, the Primary AI Assistant may ask the participants, i.e., proffer a query, if they want to schedule a meeting and asks for time, date, participant, agenda details, etc. in block 723. The Primary AI Assistant generates the item and provides it to the appropriate participant(s), in block 725. This query and back and forth is performed in interrupt mode when the Primary AI Assistant is permitted to interrupt the current speakers. Once time is up, as determined in block 713, and/or the primary user indicates that the meeting is ending as determined in block 717, the Primary AI Assistant ends the call, in block 730. The Primary AI Assistant provides a call summary and actions that should be taken to the primary user after the call ends in block 719. Optionally, the Primary AI Assistant provides the summary at the very end of the call while participants are still connected.

Figure 8:
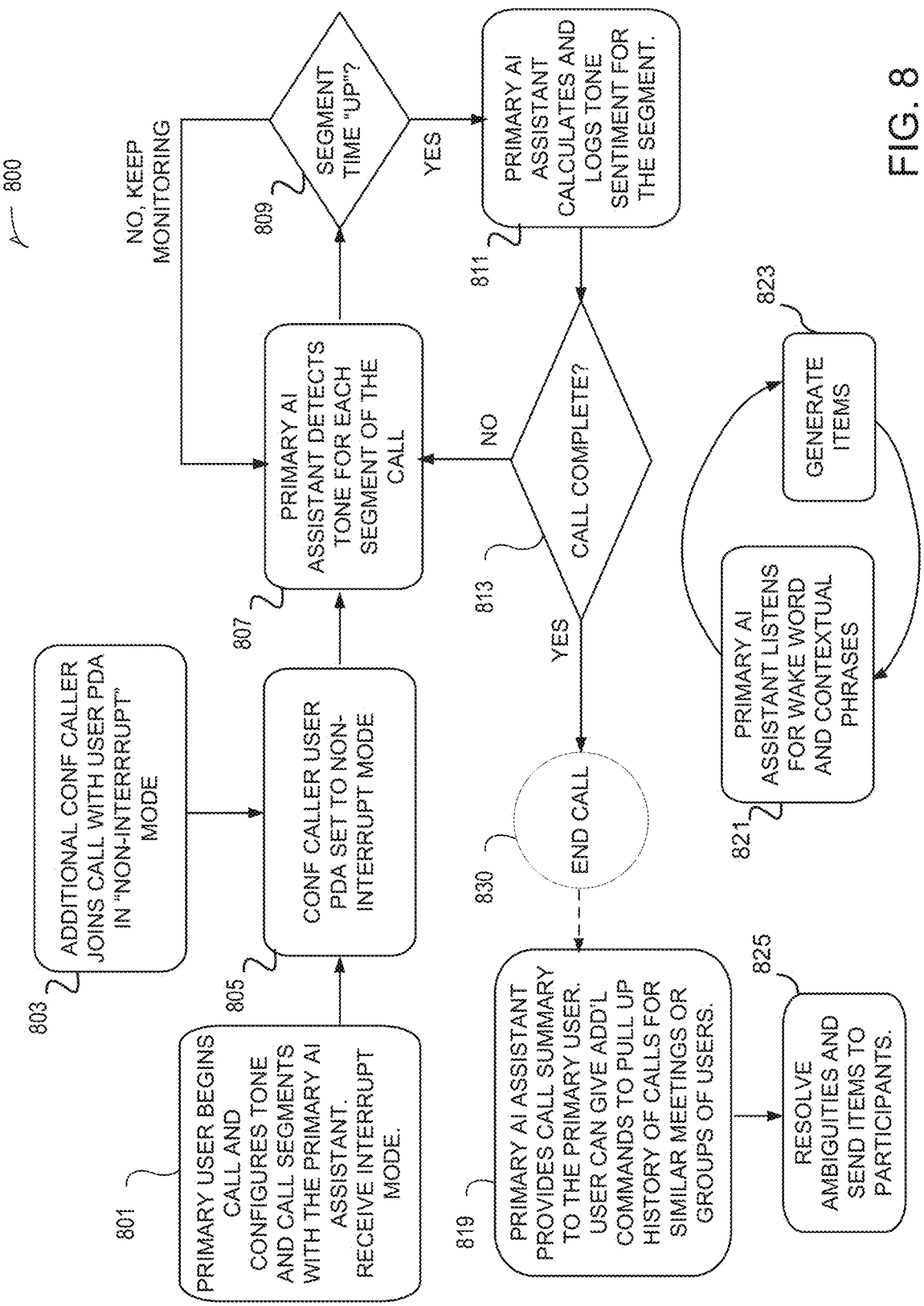
FIG. 8 shows a flow diagram of an exemplary method to perform in non-interrupt mode according to an embodiment.

FIG. 8 shows a flow diagram of an exemplary method 800 to perform in non-interrupt mode, according to an embodiment. In an embodiment, non-interrupt mode is similar to interrupt mode except that queries, confirmations and complete generation/forwarding of items occurs after the conference call has ended unless the primary user specifically uses the wake word and instructs the Primary AI Assistant to perform a function. In an embodiment, there may be a specific time during the conference call or an agenda item for follow-up discussion. In this case, the Primary AI Assistant may interrupt at a designated time during the meeting to complete scheduling items rather than wait until the conference call has completed. Thus, the meeting can generally proceed uninterrupted, but the Primary AI Assistant continues to track key words and phrases that indicate a scheduling item or task should be created for one or more participants. In an embodiment, the facilitator, e.g., primary user, initiates the conference call in block 801. In this example, the primary user provides a mode setting of non-interrupt. The primary user may input an agenda, tone, and meeting segments to the Primary AI Assistant prior to or at commencement of the conference call. It will be understood that when an AI model is being utilized, there is normally some training data that is provided to the model to enable it to recognize commands. An example can be a set of verbally spoken commands such as "schedule", "reserve" or "supplies," etc. The term "tone" here is analogous to a user command with regard to the context of the user and meeting. The primary user configures these command tones by submitting recordings of themselves stating these spoken commands into the training system, to train the model.

An additional participant joins the conference call at block 803. The additional participant may have their own user PDA. Any participant other than the primary user with a user PDA will have their user PDA set for a mode that will not attempt to coordinate tasks in the conference call. The additional participant may also set their user PDA to interrupt or non-interrupt mode. In an embodiment, the caller sets their user PDA to non-interrupt mode in block 805. In an embodiment, when the primary user sets the Primary AI Assistant to non-interrupt mode, other user's PDAs are automatically set to non-interrupt mode. The Primary AI Assistant monitors words spoken during each call segment in block 807 to those previously configured into the Primary AI Assistant during model training. The primary user's Primary AI Assistant detects a command tone for each segment of the conference call in block 807. The Primary AI Assistant monitors time and determines if a segment time is at the end of its allotted time in block 809. If the segment time is not at its end, the Primary AI Assistant continues to detect command tones in block 807. When the segment time is complete, as determined in block 809, the Primary AI Assistant calculates and logs command tones for the segment, in block 811. The Primary AI Assistant monitors the segment time and users' speech in the conference call for the segment to detect that a specific call segment is continuing or concluded. Once a segment is concluded, the Primary AI Assistant associates all commands that it detected a command tone for and stores a list of the generated commands for subsequent retrieval. The Primary AI Assistant determines if the call is complete in block 813. If not, the Primary AI Assistant continues to monitor the command tones and speech in block 807. This continues until the call is completed. When the call is complete, the Primary AI Assistant ends the call in block 830.

The Primary AI Assistant listens for the wake keywords or phrases that indicate that the participants need to perform a scheduling action or task in block 821. If the primary user speaks a command directly to the Primary AI Assistant following the wake word, the Primary AI Assistant generates a calendar item or task for the requested participants. If the primary user's command is ambiguous, the Primary AI Assistant generates the expected or draft item in block 823 but waits for completion of the call to resolve any ambiguities. In an embodiment, even when in non-interrupt mode, the Primary AI Assistant may query the primary user to resolve ambiguities without delay, when explicitly initiated by the wake word. The primary user may configure the Primary AI Assistant for various levels of non-interrupt mode to either allow for this query or delay the query until the conference call has ended. The items generated in block 823 are saved until the conference call has ended. Once the call has ended, the Primary AI Assistant provides a call summary to the primary user in block 819. The primary user can give the Primary AI Assistant additional commands and retrieve a history of calls for similar meetings or group of users. Once the call has ended, the Primary AI Assistant queries the primary user to resolve any ambiguities with the saved items, in block 825. Once the schedule and task items are complete, the Primary AI Assistant provides the items to participants' user PDAs either directly or via electronic communication as discussed above.

Figure 9:
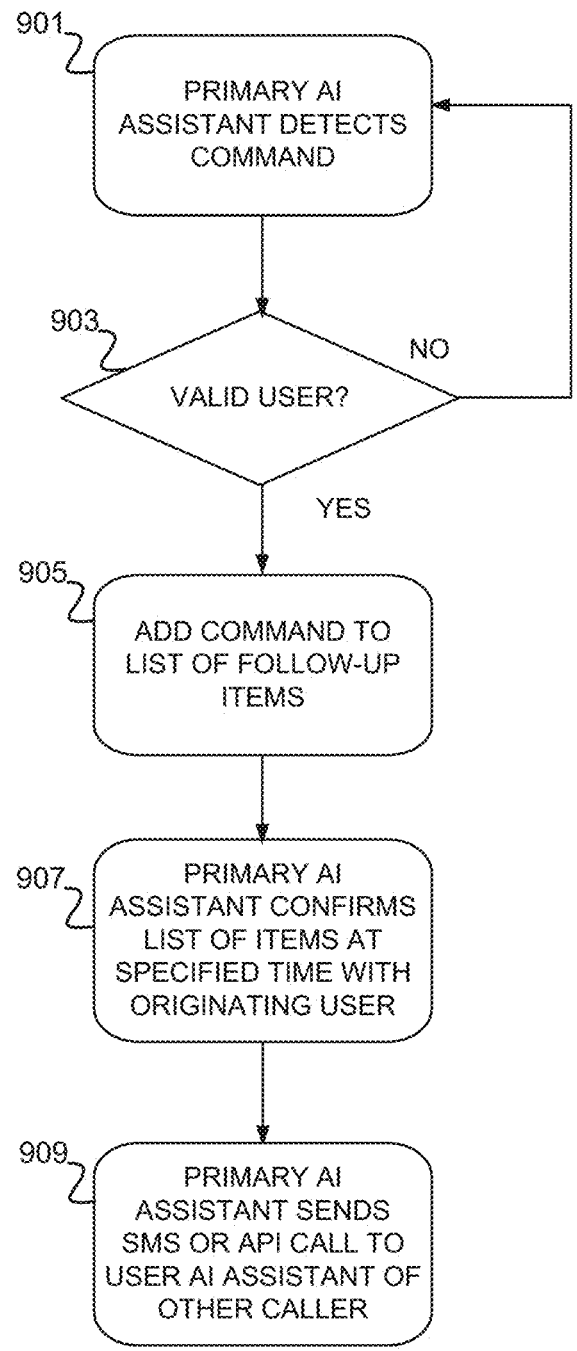
FIG. 9 shows a flow diagram of an exemplary method for follow-up scheduling according to an embodiment.

In an embodiment, follow-up of scheduling items is performed when the Primary AI Assistant cannot complete all tasks for an item or when a user originates the command. For instance, if a user PDA is required to schedule a conference room at the respective user's site, or access external documents, i.e., outside of the calendar or task scheduler, then the user and/or user PDA needs to perform additional coordination in order for the Primary AI Assistant to format the appropriate schedule items for users. In another example, a secondary user wants a to-do item added to the list for themselves and another user. FIG. 9, shows an exemplary method for follow-up scheduling, according to an embodiment. The Primary AI Assistant detects a spoken command in block 901. The Primary AI Assistant uses voice recognition, audio channel origination information, or other means to identify the user speaking, and determines whether the user is valid and authorized to initiate a command, in block 903. If not, the command is ignored and the Primary AI Assistant listens for a new command, in block 901. In any given conference call, the primary user can select which users/participants, if any, are permitted to initiate commands to the Primary AI Assistant. It the user is authorized to initiate commands, the command is added to the list of follow-up items, in block 905. The Primary AI Assistant confirms this list of partial or draft items requiring follow-up at a specified time with the item originator or the user with the outstanding action, in block 907. A time for follow-up may be pre-selected by the primary user before or at commencement of the conference call. In interrupt mode, this specified time might be ad hoc or immediate. The Primary AI Assistant sends a short message service (SMS) message or API call to the user PDA of the user requiring action in block 909. In an embodiment, the Primary AI Assistant may send a message to an external service. For instance, a command from a meeting participant might be, "get a ride share to pick me up at the end of the meeting and take me to my hotel." The Primary AI Assistant may coordinate with the user's AI Assistant to ascertain the hotel address or the user's ride share account. An API call may be sent from the user account to the ride share service to schedule a future ride. The Primary AI Assistant knows the meeting end time from the agenda or meeting time segments entered at the beginning of the meeting. In some cases, additional queries to the participants in the meeting are necessary to provide more information to format an appropriate schedule item, as discussed above.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
   in response to identifying a primary user and corresponding Primary artificial intelligence (AI) Assistant for a meeting,
   receiving by the Primary AI Assistant a confirmation to enroll at least one user personal digital assistant (PDA) of a respective one of at least one user;
   prompting the at least one user to provide descriptive information associated with the respective user PDA, wherein the descriptive information includes at least one of type, brand, model, application programming interface, or application programming interface key of the respective user PDA;
   connecting the at least one user PDA to the Primary AI Assistant internally by the Primary AI Assistant using the descriptive information for submitting requests;
   identifying by the Primary AI Assistant keywords and phrases received from the at least one user or primary user in the meeting;
   receiving by the Primary AI Assistant a mode setting of non-interrupt mode for the meeting,
   responsive to identifying the keywords and phrases by the Primary AI Assistant, identifying the need for additional information to determine a scheduling item based on the identified keywords and phrases;
   waiting by the Primary AI Assistant until one of either the meeting has completed or for a predetermined segment of the meeting to request additional information associated with the identified keywords and phrases from the primary user;
   waiting by the Primary AI Assistant for a response from the primary user, the response including the additional information associated with the identified keywords and phrases;
   determining by the Primary AI Assistant the scheduling item based on the identified keywords and phrases and the additional information; and
   automatically providing by the Primary AI Assistant the scheduling item to at least one user PDA corresponding to the scheduling item using the descriptive information.

2. The computer implemented method as recited in claim 1, further comprising:
   submitting by the Primary AI Assistant a request to enter the scheduling item to at least one of the user PDAs, wherein the submitting includes automatic modification of the at least one of the user PDAs calendar or task list for the at least one respective user.

3. The computer implemented method as recited in claim 1, further comprising:
   determining by the Primary AI Assistant a command associated with the received keywords and phrases;
   determining by the Primary AI Assistant which user issued the command;
   in response to determining which user issued the command, sending the command, by the Primary AI Assistant, to the user PDA of the user who issued the command to execute the command only on that user PDA; and
   receiving by the Primary AI Assistant information associated with execution of the command.

4. The computer implemented method as recited in claim 3, further comprising:
   waiting by the Primary AI Assistant for an acknowledgement that the command has executed;
   in response to a determination by the Primary AI Assistant that no acknowledgement was received confirming completion of the command, performing one of resending the command by a predetermined number of times to the user PDA of the user who issued the command and providing feedback to the primary user that the command was not received by the user PDA, wherein the predetermined number of times being set by the primary user.

5. The computer implemented method as recited in claim 1, further comprising:
   the Primary AI Assistant receiving meeting segment information from the primary user, the meeting segment information including at least one of a meeting agenda and time segment information for the meeting;
   wherein the Primary AI Assistant acts as a timekeeper for the meeting by:
   determining whether an allotted time for a meeting segment or agenda item has elapsed;
   determining whether the meeting has completed; and
   in response to a determination the call has completed, ending the call.

6. The computer implemented method as recited in claim 1, wherein the Primary AI Assistant includes software provided as a service in a cloud environment.

7. A computer program product comprising one or more computer readable storage media having program instructions collectively stored on the one or more computer readable storage media, the program instructions executable to:
   receive by a Primary artificial intelligence (AI) Assistant associated with a primary user in a conference call, meeting segment information;
   receive by the Primary AI Assistant a mode setting for one of either an interrupt mode or a non-interrupt mode;

identify, by the Primary AI Assistant at least one other user in the conference call, wherein at least one of the at least one other user has a corresponding user personal digital assistant (PDA);
provision the at least one corresponding user PDA for automatic access by the Primary AI Assistant;
identify by the Primary AI Assistant a possible scheduling or task item based on keywords and phrases spoken during the conference call;
responsive to identifying the possible scheduling or task item, prompt the primary user for more information corresponding to the possible scheduling or task item, wherein the prompting is performed during the conference call when in the interrupt mode and the prompting is performed at a predetermined time during or after the conference call when in the non-interrupt mode;
receive the more information from the primary user;
generate a scheduling or task item based on the keywords and phrases and the more information; and
automatically provide by the Primary AI Assistant the scheduling or task item to the at least one user PDA provisioned for automatic access.

8. The computer program product as recited in claim 7, wherein provisioning the at least one corresponding user PDA for automatic access includes:
receiving by the Primary AI Assistant a confirmation to enroll at least one of the user PDAs for access by the Primary AI Assistant;
prompting the user corresponding to the at least one of the user PDAs to provide descriptive information associated with the at least one of the user PDAs including type, brand, model, application programming interface, and application programming interface key; and
connecting the at least one user PDA to the Primary AI Assistant for access by the Primary AI Assistant using the descriptive information.

9. The computer program product as recited in claim 7, wherein the program instructions are executable to:
identify by the Primary AI Assistant using a natural language understanding model, a command corresponding to keywords and phrases received during the conference call as spoken audio;
determine by the Primary AI Assistant a scheduling item based on the identified command; and
automatically provide by the Primary AI Assistant the scheduling item to at least one user PDA corresponding to the scheduling item using the descriptive information.

10. The computer program product as recited in claim 9, wherein the program instructions are executable to:
determine by the Primary AI Assistant which user issued the command;
in response to determining which user issued the command, send the command, by the Primary AI Assistant, to the user PDA of the user who issued the command to execute the command only on that user PDA; and
receive by the Primary AI Assistant information associated with execution of the command.

11. The computer program product as recited in claim 10, wherein the program instructions are executable to:
wait by the Primary AI Assistant for an acknowledgement that the command has executed;
in response to a determination by the Primary AI Assistant that no acknowledgement was received confirming completion of the command, perform one of resending the command a predetermined number of times to the user PDA of the user who issued the command and providing feedback to the primary user that the command was not received by the user PDA, wherein the predetermined number of times being set by the primary user.

12. The computer program product as recited in claim 7, wherein the Primary AI Assistant acts as a timekeeper for the conference call, and the program instructions are executable to:
determine whether an allotted time for a meeting segment or agenda item has elapsed;
determine whether the conference call has completed; and
in response to a determination the conference call has completed, end the call.

13. A system comprising:
a processor, a computer readable memory, one or more computer readable storage media, and program instructions collectively stored on the one or more computer readable storage media, the program instructions executable to:
receive by a Primary artificial intelligence (AI) Assistant associated with a primary user in a conference call a mode setting for one of either an interrupt mode or a non-interrupt mode;
identify by the Primary AI Assistant a plurality of users in the conference call, wherein at least one of the plurality of users has a corresponding user personal digital assistant (PDA);
provision the corresponding user PDA for automatic access by the Primary AI Assistant;
identify by the Primary AI Assistant keywords and phrases spoken during the conference call, wherein the keywords and phrases correspond to a scheduling item;
responsive to identifying the keywords and phrases, prompt the primary user for more information corresponding to the keywords and phrases, wherein the prompting is performed during the conference call when in the interrupt mode and the prompting is performed at a predetermined time during or after the conference call when in the non-interrupt mode;
receive the more information from the primary user;
generate the scheduling item based on the keywords and phrases and the more information; and
automatically provide by the Primary AI Assistant the scheduling item to the corresponding user PDA provisioned for automatic access.

14. The system as recited in claim 13, wherein the program instructions are executable to:
receive by the Primary AI Assistant meeting segment information, the meeting segment information including at least one of a meeting agenda and time segment information for the conference call.

15. The system as recited in claim 13, wherein provisioning the at least one corresponding user PDA for automatic access includes:
receiving by the Primary AI Assistant a confirmation to enroll the corresponding user PDA for access by the Primary AI Assistant;
prompting the user corresponding to the corresponding user PDA to provide descriptive information associated with the corresponding user PDA including type, brand, model, application programming interface, and application programming interface key; and
connecting corresponding user PDA to the Primary AI Assistant for access by the Primary AI Assistant using the descriptive information.

16. The system as recited in claim 15, wherein the program instructions are executable to:

identify by the Primary AI Assistant using a natural language understanding model, a command corresponding to the keywords and phrases received during the conference call as spoken audio;

automatically provide by the Primary AI Assistant, the scheduling item to at least one user PDA corresponding to the scheduling item using the descriptive information.

17. The system as recited in claim 16, wherein the program instructions are executable to:

determine by the Primary AI Assistant which user issued the command;

in response to determining which user issued the command, send the command, by the Primary AI Assistant, to the user PDA of the user who issued the command to execute the command only on that user PDA; and receive by the Primary AI Assistant information associated with execution of the command.

18. The system as recited in claim 13, wherein the Primary AI Assistant acts as a timekeeper for the conference call, and the program instructions are executable to:

determine whether an allotted time for a meeting segment or agenda item has elapsed;

determine whether the conference call has completed; and in response to a determination the conference call has completed, end the call.

* * * * *